Patented Mar. 12, 1940

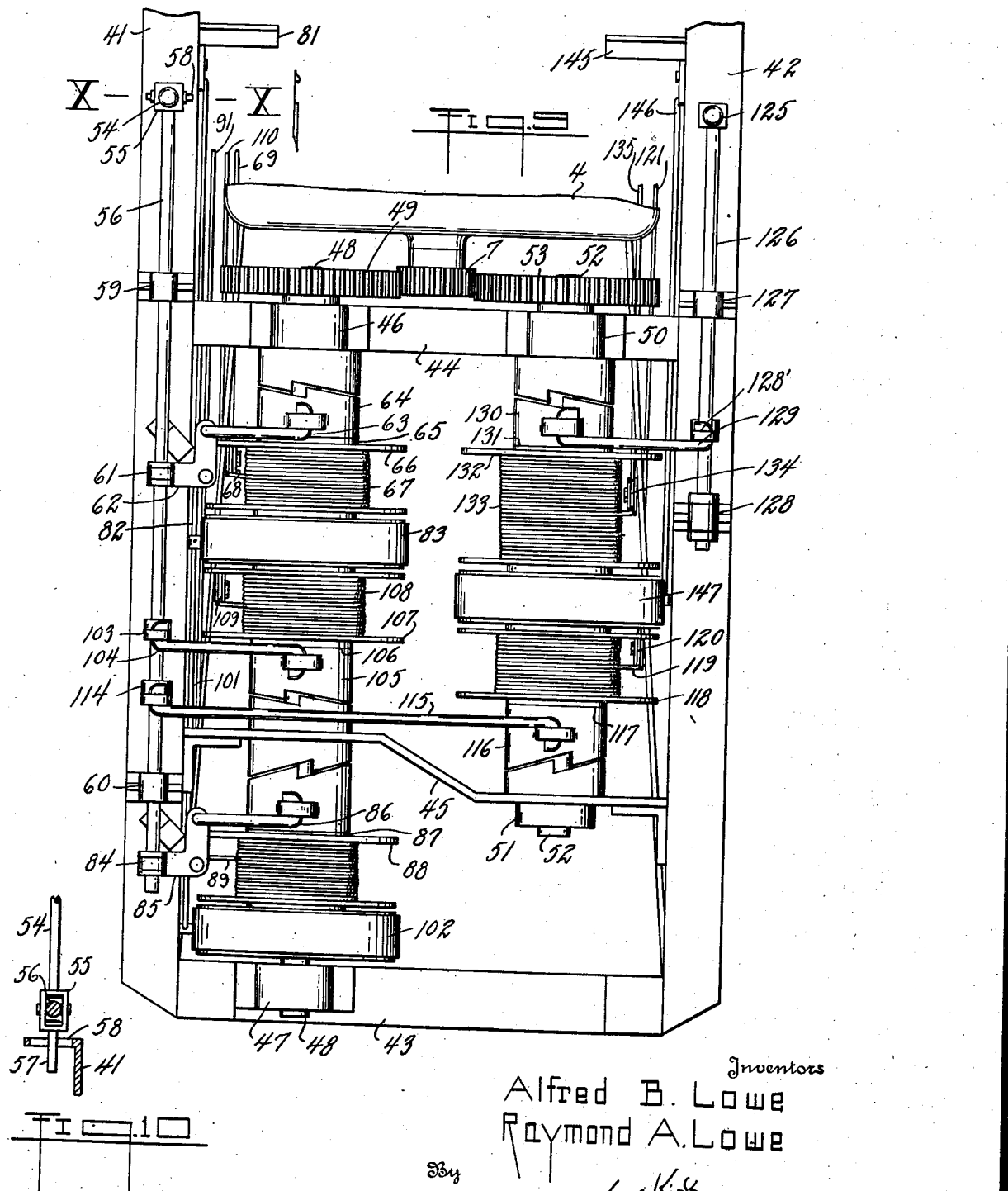

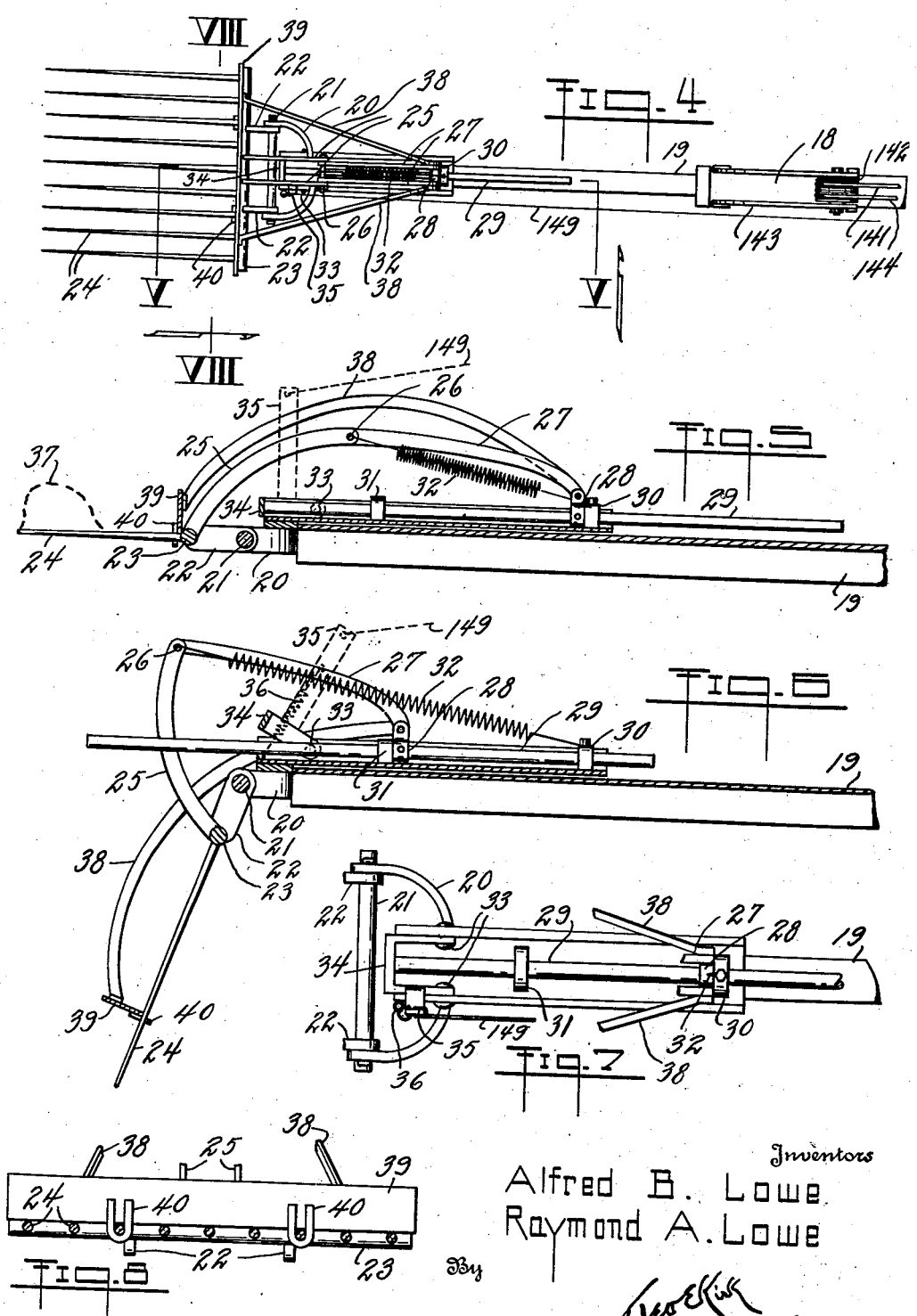

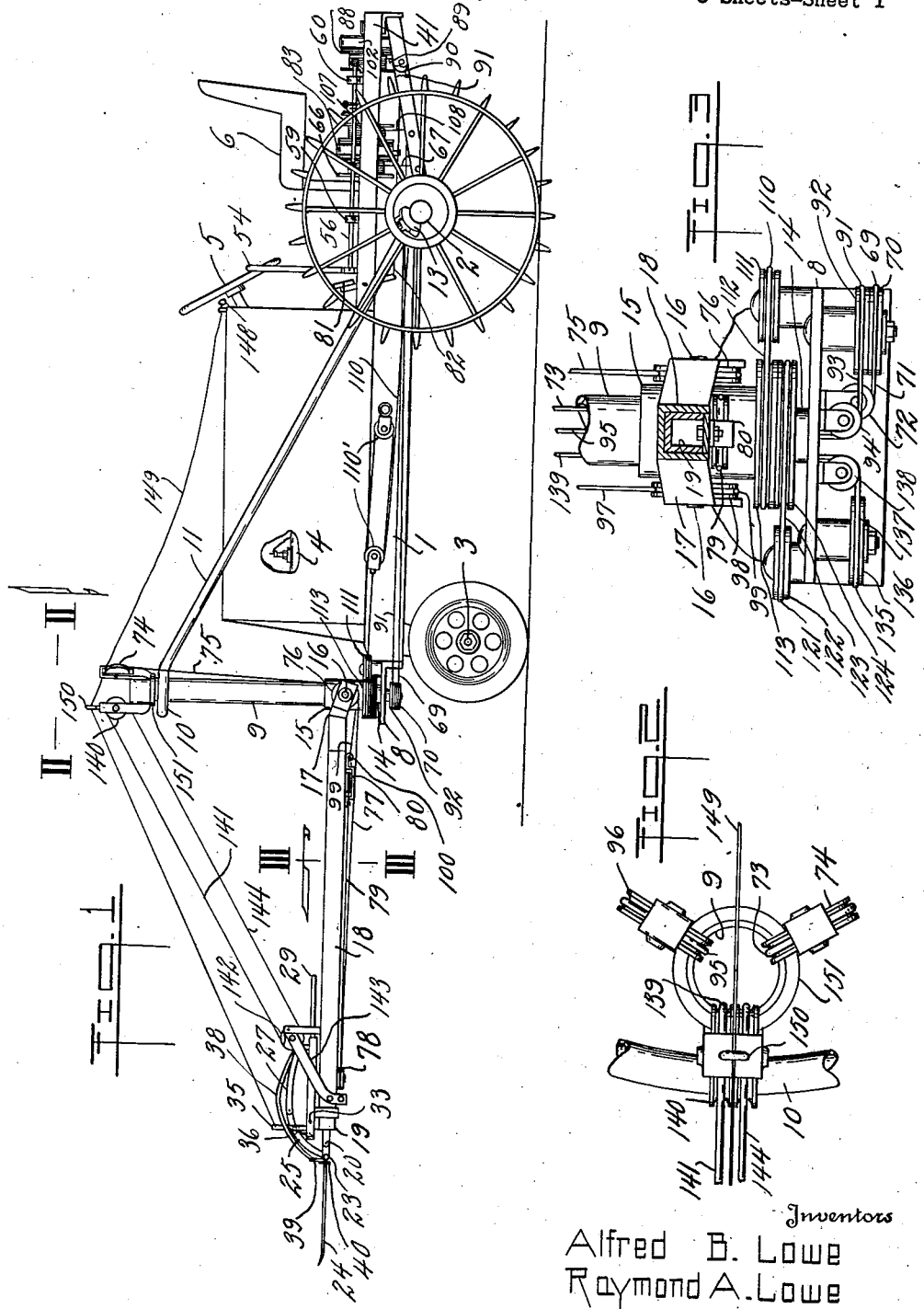

2,193,560

UNITED STATES PATENT OFFICE 2,193,560

TRACTOR ACCESSORY

Alfred B. Lowe and Raymond A. Lowe, Oak Harbor, Ohio

Application May 23, 1939, Serial No. 275,260

4 Claims. (Cl. 214—132)

This invention relates to material handling tools of the digging or loading type and adapted as a tractor accessory.

This invention has utility when incorporated for mounting on tractors as a boom type of self-loading and self-discharging digging implement, even of open shovel or tine type, and wherein there may be control for swinging of the implement or shovel relatively to the tractor and further thrusting to vary the range of operation with the controls from the driver's station.

Referring to the drawings:

Fig. 1 is a side elevation of a tractor having an embodiment of the invention herein incorporated therewith;

Fig. 2 is a view on the line II—II, Fig. 1, looking into the top of the column as mounted forwardly of the tractor and adapted to carry the boom;

Fig. 3 is a view on the line III—III, Fig. 1, showing the boom mounting on the turn table at the column base forwardly of the tractor chassis;

Fig. 4 is a plan view of the digging tool or fork end portion of its handle or boom;

Fig. 5 is a section on the line V—V, Fig. 4, showing features of the implement control in set-up or operating position;

Fig. 6 is a view similar to Fig. 5, with the control in dump or self-discharging position as to the implement;

Fig. 7 is a detail plan view, with parts broken away, of features of the implement mounting and control;

Fig. 8 is a section on the line VIII—VIII, Fig. 4, showing the self-discharging device for freeing the tines of the tool of material tending to adhere thereto;

Fig. 9 is a plan view, with parts broken away, of the mechanism connections at the power take-off for the implement or boom handle device; and Fig. 10 is a section on the line X—X, Fig. 9, showing the multiple direction control handle as incidental to the control herein.

Tractor is herein shown having chassis 1 (Fig. 1), rear axle 2, front axle 3, power plant 4, steering wheel 5, and driver's station 6. From this power plant 4 (Fig. 9) there is power take-off gear 7. The chassis 1 (Fig. 1) has forwardly bracket 8, from which upwardly extends column 9 having near its upper portion and fixed therewith collar 10 from which diverging struts 11 have rigid connection 12 with housing 13 on the rear axle 2. Mounted on this fixed column 9, adjacent the bracket 8, is turntable 14 fixed with collar 15 thereover, rotatable relatively to the column 9. This collar 15 carries pivot means 16 mounting forwardly extending fork 17, from which extends boom section box 18. This boom section 18 houses extension boom section 19 telescoped therein.

The boom section 19 (Figs. 4, 5, 6) has terminal portion 20 mounting pivot bar 21, from which extend ears 22 mounting cross-connection 23 carrying tines 24 of this open shovel or digging implement. From this cross-connection 23 and rigid therewith, there extends upwardly and rearwardly a pair of arms 25 to pivot pin 26 as connection to link 27 pivotally engaging collar 28, fixed with rod 29, slidable in eyes 30, 31, fixed with the boom extension 19. From this pivot pin 26 is tension helical spring 32 extending to the eye 30 and thereby normally holding the working tool 24 in position approximating alignment with the boom 19 or in working or load receiving position. This position is positively retained due to a holding device, herein shown as having pivotal connection 33 fixed with the boom portion 19 and having therebetween U-shaped portion 34 normally in alignment with the rod 29 to hold such rod in such position that the collar 28 is adjacent the eye 30. This U-piece 34 has riser 35 therefrom. Connected to this riser is tension helical spring 36 resisting shifting of this U-shaped piece away from across the end portion of this rod 29.

Swinging of this holding device 34 clear of the rod 29 allows load 37 on the tool to overcome the action of the spring 32 and swing this tool on the pivot pin 21 into depending position as to the boom 18, thereby tending to allow such load 37 to clear the tool 24. However, in this movement there is automatic self-clearing control herein, for from this collar 28 there extend bow portions 38 to cross-member 39 adjacent the tines 24 and held in such position by tine-enveloping U-pieces 40, weld assembled with this strip or cross-member 39. This means that these bows 38 will thrust this cross-member 39 along the tines 24 to thrust the load 37 clear of such tines and thereby provide automatic self-clearing or self-discharging means for this working tool.

Weld or bolt anchored with the chassis in an effective manner analogous to that adopted for the bracket 8 is a supplemental frame embodying parallel side members 41, 42, (Fig. 9), with cross connecting member 43. Additionally there are bearing providing cross-members 44, 45. The members 44, 43, provide bearings 46, 47, for shaft 48 having gear 49 in mesh with the gear 7. The cross-pieces 44, 45, provide bearings 50, 51, for shaft 52 having gear 53 also in mesh with the power take-off gear 7. Hand lever 54 has mounting 55 connected to control rod 56. This lever 54 has extension 57 (Fig. 10) in slot 58 of the frame bar 41 (Fig. 9). This means that a forward thrust of the lever 54 will act on the side of this slot 58 as a fulcrum and be effective to draw the rod 56 in guides 59, 60, and thereby be effective from collar 61 to act on bell crank 62, and through link 63 thrust wedge collar 64 to act on friction clutch disks 65 in drum 66 for effecting driving winding on cable 67 having extending therefrom over guide pulley 68 reach 69 (Figs. 1, 3) about pulley 70 carried by the bracket 8, thence by reach 71 about pulley 72 and by reach 73 in the column 9 pass about guide pulley 74 by reach 75 on the outside of the column 9 to pass about pulley 76 (Fig. 3) on the pivot pin 16, and thence along by reach 77 and boom 18 about pulley 78 (Fig. 1), on the section 18, thence by reach 79 to attachment 80 with the boom portion 19. This pulling action is effected at the drum 67, thus telescopically pulling the boom section 19 out of the boom section 18 in projecting the tool 24 for greater range of operation as to the distance from the chassis 1 of the tractor. As such distance of effective thrust is attained, foot lever 81 (Fig. 9) may be thrust forward and through link 82 act on band brake 83 to hold the drum 67 and thereby maintain the determined adjustment for this implement as the lever 54 releases the drive.

There may be positive operation to effect shortening of the shovel or tool operation by the reverse throw of the hand lever 54 effective through collar 84 and bell crank lever 85 on wedge control 86 to act through clutch disks 87 in locking drum 88 to be driven from the shaft 48 and thereby cause cable 89 passing about pulley 90 to have its reach 91 pass about pulley 92 (Figs. 1, 3) and therefrom by reach 93 about pulley 94 to pass from said pulley 94 by reach 95 upward through the column 9, thence to pass about pulley 96 (Fig. 2) with reach 97 downward therefrom about pulley 98 (Fig. 3) on the pivot pin 16, and thence by reach 99 (Fig. 1) to engage connection 100 with the extension 19 and thus pull such boom extension 19 into the boom section 18 the desired distance. As this control for shortening is attained, it is only necessary that the brake pedal 81 be again operated and link extension 101 therefrom to brake band 102 is effective for holding the drive released drum 88.

This thrusting in and out as to the implement relative to the chassis is independent of any swinging or shifting. To effect swinging, the handle 54 may be (say) swung to the left or outward from the chassis and thereby rock the rod 56, which has thereon upwardly extending arm 103 connected to link 104 engaging wedge piece 105, thereby operating disk clutch 106 to cause drum 107 to be locked with the shaft 48 and thereby drive through cable 108 passing about guide pulley 109 to reach 110 and cable gear speed reduction block 110' to pulley 111 (Figs. 1, 3) fixed with the bracket 8. From this pulley 111 reach 112 passes about turn table and is anchored with pulley 113 fixed with the collar 15 and thereby causes a pulling or swinging of the boom 18 to the left or counter-clockwise.

In the event it is desired to effect the clockwise or reverse swinging of the boom, the handle 54 (Fig. 9) is swung inward and such rocking is effective at arm 114 through link 115 to wedge 116 on the shaft 52, thereby throwing disk clutch 117 into driving connection for drum 118 from the shaft 52. This means that cable 119 from the drum 118 passes about guide pulley 120 and by reach 121 extends through speed reduction similar to the block 110' to pulley 122 (Fig. 3) on the bracket 8 opposite from the pulley 111 and has reach 123 therefrom pass about turn table pulley 124 to which it is fast, and thereby swing the collar 15 together with the boom 18, 19, in a clockwise or right hand direction opposite to that effected from the pulley 113. These controls from the hand lever 54 are thus effective for the projecting and swinging of the boom, together with its implement or tool at its free end or outer terminus.

In the further handling of the tool, such may be effected from hand lever 125 to the right of the driver's station, from which there extends rod 126 in bearings 127, 128, of the frame portion 42. A swinging of this hand lever 125 outwardly rocks the rod 126 and is effective at riser arm 128' through link 129 on wedge collar 130, thus throwing in disk clutch 131 to effect driving from the shaft 52 of drum 132 carrying cable 133 passing therefrom about guide pulley 134 by reach 135 (Fig. 3) to guide pulley 136 fixed to the bracket 8, thence by reach 137 about guide pulley 138 and upward by reach 139 in the column 9, to pass therefrom by guide pulley 140 (Fig. 1) and reach 141 to pulley 142 in bracket 143 fixedly connected with the primary boom portion 18 remote from the column 9. This pulley 142 is in pulley block which may have reach 144 therefrom back to the block or boom 140 for the desired speed reduction in the effecting of lifting or lowering of the boom. As such desired extent of shifting is attained the operator may use brake pedal 145 (Fig. 9), effective through link 146 on brake band 147 and thereby hold the drum 132 as unclutched from the shaft 52 and against further raising or lowering of the boom 18. This means that the boom may be held downward to the desired extent in the work or upward to the desired extent from the work.

Herein with this accessory there may be the usual controls for the power plant of the tractor and the rendering effective of the power take-off gear 7. The various cable shafts 48, 52, are normally disconnected or loose therefrom. Holding action may be effected through the respective brakes while the driving is effected upon release of the brakes and the connecting end of the respective friction clutches. As the clutches are released the devices are free of the respective shafts.

In this latter position (say), as swung clear for dumping, there may be adjacent the operator's station 6 a pull handle 148 (Fig. 1), from which line 149 extends about guide 150 adjacent the top of the column 9, and from thence to the upright 35 adjacent the implement. It is thus seen that a pulling of this handle 148 will rock the holder 34 clear of the rod 29 and thereby allow the load 37 to swing the tool 24 on the axis 21 into depending position for gravity falling of the load therefrom, which action is assisted by the member 39 as sliding along these tines 24. While the column 9 is rigid upward terminal collar 151 mounting the upper pulleys is controlled to swing with the boom 18, and thereby maintain the desired alignment for the cables in the operations.

There is disclosed herein an accessory which is readily effective in the handling of produce even from digging, say as beets, potatoes, and like products for loading, and even manure or other bulk material. This device permits ready location and working in a range from a location independently of shifting the tractor during such operation or there may be regular tractor transit, all to be handled from the operator's station, and this handling is effective for swinging of the working tool as to the tractor chassis, raising or lowering of the tool, thrusting or withdrawing the tool, and whether elevated or lowered to discharge material therefrom.

In the use of the term "tractor" herein, there has been special reference to that type of self-propulsion vehicle for power duty with power take-off. However, the adaptation herein and the use of the term is primarily to apply to self-propelled vehicles or so-called motor vehicles of the truck or type in which the body may be one having provision for the mounting of the various controls, there being retained the location for the column and boom.

What is claimed and it is desired to secure by United States Letters Patent is:

1. For a tractor having a power take-off, a driver's station, and a chassis, a column mountable on the chassis, a boom, a material handling multiple prong implement mounted by the boom remote from the column, a control for swinging the column and boom therewith, and a discharge control guided by the prongs and movable relatively thereto for clearing the implement of load, said control having connection from the column to the implement.

2. For a tractor having a power take-off, a driver's station, a chassis, and ground wheels for the chassis, a boom forwardly of the ground wheels, a column rising from the chassis and providing adjacent the chassis a swing connection for the boom with the chassis, a transmission connected from the power take-off to the chassis and rearwardly of the ground wheels adjacent the driver's station, a tool connected to the free end of the boom, and control means for the tool and boom at the driver's station as fronting toward the boom.

3. A tractor having a power take-off, a driver's station, a chassis, and ground wheels supporting the chassis, a boom mounted forwardly of the ground wheels on the chassis remote from and in front of the station, shift mechanism for the boom mounted on the chassis adjacent the driver's station and connected to the power take-off for swinging the boom as to the chassis and extending the effective length of the boom, and a selective control for the swinging and extension controls adjacent the driver's station whereby power source propelling the tractor is the power source to extend and swing the boom.

4. For a tractor having a power take-off, a driver's station, and a chassis, a column mountable on the chassis, a boom, a material handling implement mounted by the boom remote from the column, a control for swinging the column and boom therewith, and a discharge control for clearing the implement of load having connection from the column to the implement.

ALFRED B. LOWE.
RAYMOND A. LOWE.